J. H. RAPP.
MEANS FOR OPERATING MOTOR CYCLE EXHAUST WHISTLES.
APPLICATION FILED NOV. 7, 1910.

1,003,152.

Patented Sept. 12, 1911.

2 SHEETS—SHEET 1.

Witnesses:
C. E. Wessels.
A. A. Olson.

Inventor:
John H. Rapp,
By Joshua R. H. Potts
his Attorney.

J. H. RAPP.
MEANS FOR OPERATING MOTOR CYCLE EXHAUST WHISTLES.
APPLICATION FILED NOV. 7, 1910.

1,003,152.

Patented Sept. 12, 1911.

2 SHEETS—SHEET 2.

Witnesses:
C. E. Wessels.
A. A. Olson.

Inventor:
John H. Rapp,
By Joshua R.H. Port
his Attorney.

UNITED STATES PATENT OFFICE.

JOHN HOWARTH RAPP, OF CHICAGO, ILLINOIS.

MEANS FOR OPERATING MOTOR-CYCLE EXHAUST-WHISTLES.

1,003,152.　　　　　　　Specification of Letters Patent.　　Patented Sept. 12, 1911.

Application filed November 7, 1910.　Serial No. 591,057.

*To all whom it may concern:*

Be it known that I, JOHN H. RAPP, a citizen of the United States, and a resident of the city of Chicago, county of Cook, and State of Illinois, have invented certain new and useful Improvements in Means for Operating Motor-Cycle Exhaust-Whistles, of which the following is a specification.

My invention relates to motor cycles, that is to cycles which are propelled by internal combustion engines, and more specifically to whistles employed in connection with the former which are connected with the exhaust pipes of the engine thereof.

The object of my invention is the provision of means for manually controlling such whistles whereby the latter may be operated by a cycle operator with greatest ease and readiness.

A further object is the provision of whistle controlling means of the character mentioned which will be of durable and economical construction and efficient in operation.

Other objects will appear hereinafter.

With these objects in view my invention consists in whistle controlling means characterized as above mentioned and in certain details of construction and arrangements of parts all as will be hereinafter more fully described and particularly pointed out in the appended claims.

My invention will be more readily understood by reference to the accompanying drawings forming a part of this specification, and in which—

Figure 1:
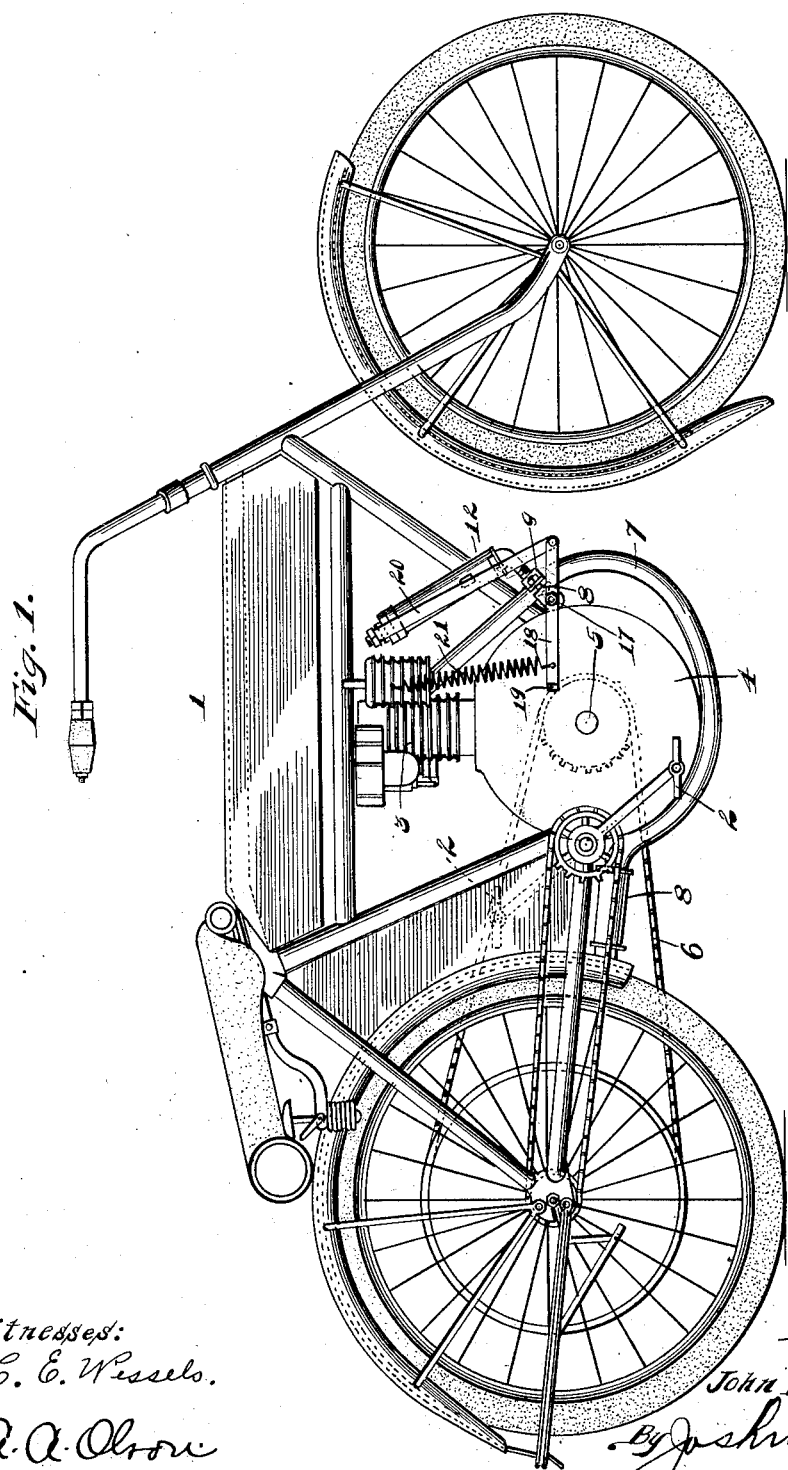
Figure 2:
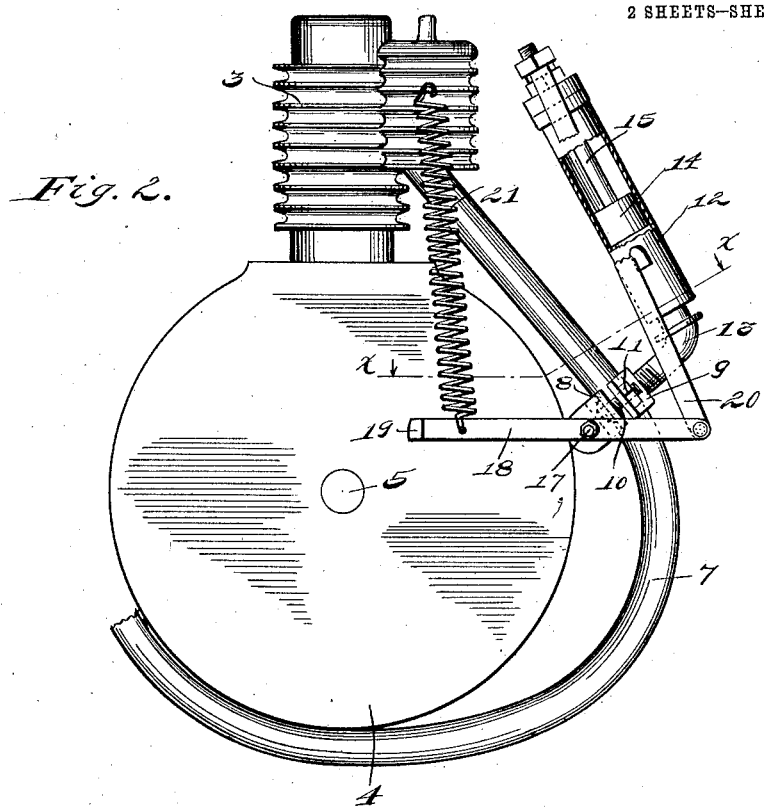
Figure 3:
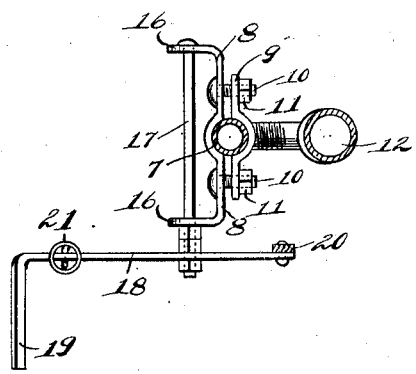

Figure 1 is a side elevation of a conventional motor cycle provided with an exhaust whistle to which is applied a whistle controlling mechanism embodying the preferred form of my invention, Fig. 2 is an enlarged detail, partially in section, of the engine and crank shaft of the cycle bearing the exhaust whistle and the means for controlling same, and Fig. 3 is a transverse section taken on substantially line $x$—$x$ of Fig. 2.

Referring now to the drawings 1 indicates a motor cycle which may be of any ordinary or preferred design, 2 indicating the pedals thereof which are geared in the ordinary manner to the rear wheel of the cycle for propulsion of the latter. Mounted in the frame of the cycle in the ordinary manner is an internal combustion engine 3, 4 indicating the crank case thereof in which is mounted the power shaft 5, the latter being connected with the rear wheel of the cycle by means of the chain 6. Leading from the engine 3 is the exhaust pipe 7 terminating at its rearward extremity in the muffler 8.

Arranged upon the exhaust pipe 7 are saddle straps 8 and 9, the same being rigidly clamped thereon by means of bolts 10 and nuts 11 threaded upon the latter. Arranged adjacent the exhaust pipe is the signal whistle 12, the same being secured in position by means of an elbow 13 which is threaded into the strap 9, the lower or rearward extremity of said elbow intersecting the exhaust pipe 7, so that when the engine is in operation, a portion of the exhaust gases passing through the pipe 7 will pass into the elbow 13 and up through the whistle 12 for operation of the latter. Slidably mounted within the cylindrical or tubular casing of said whistle is a piston 14 carried at the lower extremity of an exteriorly projecting piston rod 15. The piston 14 sliding in said whistle casing forms a resonance chamber the size of which is adjustable and emits a varying sound according as the piston is moved toward or away from the lower end of said whistle casing, the arrangement being such that when said piston is at its lower terminal of movement in said whistle casing no sound will be produced, and so that when it is desired to sound the whistle it is required to slide said piston upwardly.

The construction thus far described is old and well known no claim being made thereto, the construction described in the following for operating the whistle piston being the subject matter of the present invention.

Formed at the extremities of the strap 8 are rearwardly projecting ears 16 in which is mounted a pivotal pin 17. Rockingly or pivotally mounted upon the pin 17 intermediate its extremities, is a lever 18. The rearward end of said lever 18 is angularly formed to constitute a foot engagement portion 19 which is arranged in close proximity to the path of the pedal 2 at the corresponding side of the cycle. The forward extremity of the lever 18 is operatively connected by means of a link 20, to the upper or exteriorly projecting extremity of the piston rod 15 so that upward movement of said extremity of said lever, or downward movement of the opposite extremity of the latter will effect upward sliding of the piston 14 in the whistle casing. Connected to the lever 18 adjacent the rearward extremity thereof is the lower extremity of a tension spring 21, the upper extremity of said spring being suitably fixed and preferably as shown in the drawings, to a suitable portion of the engine 3. Said spring, as will be observed, serves as a means of normally holding the rearward extremity of said lever in elevated position and hence the piston 14 at its lower terminal of movement or in inoperative position in the whistle casing.

With the arrangement as set forth it will be seen that the operation of the signal whistle may be effected by depression of the portion 19 of the lever 18, such portion being so arranged that engagement thereof may be readily made by the foot engaging the pedal 2 positioned adjacent thereto when the motor cycle is in use. At the present time whistles of this character are ordinarily operated by the hand, the operator, in operating the same, being required to loosen his grip upon the handle bars and to bend over in order to engage the upper extremity of the piston rod. With the present mechanism this will be unnecessary, since the operation of the whistle may be readily and easily effected by but slight movement of the foot.

The construction set forth is durable and economical, the same, because of its simplicity, is not susceptible to readily becoming inoperative, and is of great efficiency in operation.

While I have shown what I deem to be the preferable form of my whistle operating mechanism, I do not wish to be limited thereto as there might be various changes made in the details of construction and the arrangements of parts described, without departing from the spirit of the invention, and hence I desire to avail myself of such variations and modifications as come within the scope of the appended claims.

Having described my invention what I claim as new and desire to secure by Letters Patent is:

1. The combination with a motor cycle and a piston controlled whistle connected with the exhaust thereof, of means for operating said whistle piston, said means comprising foot operable means operatively connected with said piston and adapted upon depression to effect the operation of said piston, the foot engagement portion of said means extending into operative proximity with one of the pedals of said cycle, substantially as described.

2. The combination with a motor cycle and a piston controlled whistle connected with the exhaust thereof, of means for operating said whistle piston, said means comprising a rockingly mounted lever having one end extending in operative proximity with one of the foot rests of the cycle; and means connecting the other end of said lever with said whistle piston for operation of the latter, substantially as described.

3. The combination with a motor cycle and a piston controlled whistle connected with a supply of gas under pressure, of means for operating said whistle piston, said means comprising a pivoted lever having one end extending into operative proximity with one of the pedals of said cycle; means operably connecting the other extremity of said lever with said whistle piston and resilient means for holding said whistle piston in inoperative position, substantially as described.

4. The combination with a motor cycle and piston controlled whistle mounted in said cycle and connected with a supply of gas under pressure, of means for operating said whistle piston, said means comprising a pivoted lever having one end extending into operative proximity with one of the pedals of said cycle; a link connecting the other end of said lever with said whistle piston so that rocking of said lever effects longitudinal operation of said piston; and a spring connected with said lever for normally holding said piston in inoperative position, substantially as described.

In testimony whereof I have signed my name to this specification in the presence of two subscribing witnesses.

JOHN HOWARTH RAPP.

Witnesses:
 Joshua R. H. Potts,
 W. C. Smith.

---

Copies of this patent may be obtained for five cents each, by addressing the "Commissioner of Patents, Washington, D. C."